(12) United States Patent
Stevens

(10) Patent No.: US 7,097,154 B2
(45) Date of Patent: Aug. 29, 2006

(54) EXTENDED LENGTH STRAND TAKE UP DEVICE

(76) Inventor: James A. Stevens, 3725 Park Rd., Charlotte, NC (US) 28209

( * ) Notice: Subject to any disclaimer, the term of this patent is extended or adjusted under 35 U.S.C. 154(b) by 0 days.

(21) Appl. No.: 10/924,492

(22) Filed: Aug. 24, 2004

(65) Prior Publication Data

US 2006/0151761 A1    Jul. 13, 2006

(51) Int. Cl.
   *B21F 9/00*   (2006.01)
(52) U.S. Cl. .................. 254/233; 254/234; 248/545; 403/79; 52/148; 174/40 TD
(58) Field of Classification Search ........ 254/231–234; 248/499, 545; 403/24, 79, 2; 52/98, 148; 174/40 TD See application file for complete search history.

(56) References Cited

U.S. PATENT DOCUMENTS

| | | | |
|---|---|---|---|
| 161,832 A | | 4/1875 | Spencer |
| 188,442 A | | 3/1877 | Tobin |
| 299,795 A | * | 6/1884 | Jones et al. .................. 254/232 |
| 305,876 A | * | 9/1884 | Ainsworth .................. 254/233 |
| 458,099 A | * | 8/1891 | Darst ......................... 254/233 |
| 511,710 A | * | 12/1893 | McKeon ..................... 254/232 |
| 663,898 A | * | 12/1900 | Homes ....................... 157/1.14 |
| 938,488 A | * | 11/1909 | Hopkins ..................... 254/231 |
| 957,823 A | | 5/1910 | Viles |
| 974,637 A | * | 11/1910 | Borup ........................ 254/233 |
| 1,020,748 A | * | 3/1912 | Dobson ................... 73/862.42 |
| 1,316,294 A | * | 9/1919 | Freed ......................... 254/232 |
| 1,343,336 A | * | 6/1920 | Ragona ..................... 254/234 |
| 1,714,187 A | | 5/1929 | Pacy |
| 1,995,425 A | * | 3/1935 | Herring ..................... 254/234 |
| 2,654,796 A | * | 10/1953 | Hubbard .................... 254/232 |
| 3,284,050 A | * | 11/1966 | De Meyer ................. 473/557 |
| 3,341,995 A | | 9/1967 | Docken |
| 3,346,236 A | * | 10/1967 | Hubbard et al. ............ 254/232 |
| 3,901,476 A | * | 8/1975 | Giampaglia ................ 254/231 |
| 4,190,234 A | * | 2/1980 | Coleman .................... 254/232 |
| 4,201,367 A | * | 5/1980 | Konen, Sr. ................. 254/231 |
| 4,760,640 A | * | 8/1988 | Lawrence ................... 29/760 |
| 5,911,409 A | * | 6/1999 | Grover ....................... 254/235 |

* cited by examiner

*Primary Examiner*—Emmanuel M Marcelo
(74) *Attorney, Agent, or Firm*—Coats & Bennett, P.L.L.C.

(57) ABSTRACT

An extended length strand take up device comprises at least two tension rods disposed in parallel spaced relationship to one another, and a first connecting body slidably mounted on the tension rods for connecting the extended length strand take up device to a guy wire, and a second a first connecting body slidably mounted on the tension rods for connecting the extended length strand take up device to a ground anchor. The first and second connecting bodies each include at least two side load tubes interconnected by a central web, each side load tube being slidably disposed on a respective one of said tension rods. A stop member at each end of said tension rods retains the first and second connecting bodies on the tension rods.

14 Claims, 4 Drawing Sheets

EXTENDED LENGTH STRAND TAKE UP DEVICE

BACKGROUND OF THE INVENTION

The present invention relates generally to guyed towers for broadcast radio, television, microwave and cellular communications and, more particularly, to a tensioning device for tensioning guy wires that stabilize guyed towers.

There are three basic types of towers—guyed, self-supporting, and monopoles (MP). A guyed tower is a slender, steel structure supported by high strength steel guy cables that anchor the tower to the ground. A guyed tower is typically constructed in prefabricated sections that can be assembled and bolted together on site to reduce installation time and cost. Guyed towers suit a wide range of loading conditions and can be used as broadcast towers, microwave towers, and/or cellular towers.

Periodic inspections and maintenance of guyed towers is important to increase the service life of the tower and to ensure safety of persons and property in the vicinity of the tower. Severe loading conditions and corrosive forces can impair the integrity of the tower structure, and, if not corrected, can lead to tower failure. One area of concern is the presence of broken strands, corrosion, or fraying in guy wires. If damaged guy wires are not properly attended to, the guy wires may break under severe loading conditions, greatly increasing the possibility of a catastrophic failure.

It is recommended that guy wires and guy anchors be inspected at least quarterly. During such inspections, the ends of the guy wire are typically inspected for signs of fatigue, such as broken strands, or corrosion. Most guy wire failures occur at the ends of the guy wire adjacent the connection to either the tower or the ground anchor. If the guy wire shows signs of fatigue or excessive corrosion, the damaged end is cut off. A problem that often occurs when repairing damaged guy wires is that the remaining portion of the guy wire left after the damaged end is cut off is too short to make the connection between the tower and the ground anchor. In these cases, the entire guy wire is typically replaced, which can be time consuming and expensive. It would be beneficial if a way could be devised for reusing a guy wire that has been cut short to remove a damaged or frayed end.

SUMMARY OF THE INVENTION

The present invention relates to an extended length strand take up device that may be used to repair damaged guy wires in the field. The extended length strand take up device comprises two connecting bodies interconnected by a pair of tension rods that extend continuously between the connecting bodies. The tension rods may, for example, comprise a pair of high-strength threaded rods. Each connecting body comprises a central web with side load tubes on opposing sides thereof. The side load tubes slide over the tension rods and are held in place by threaded nuts screwed onto the end of the tension rods. The central web of each connecting body may further include an inwardly-facing pull tab that can be used for pre-tensioning the guy wire. A hydraulic tensioner may be connected between the pull tabs and used to tension the guy wire.

DETAILED DESCRIPTION OF THE INVENTION

Figure 1:
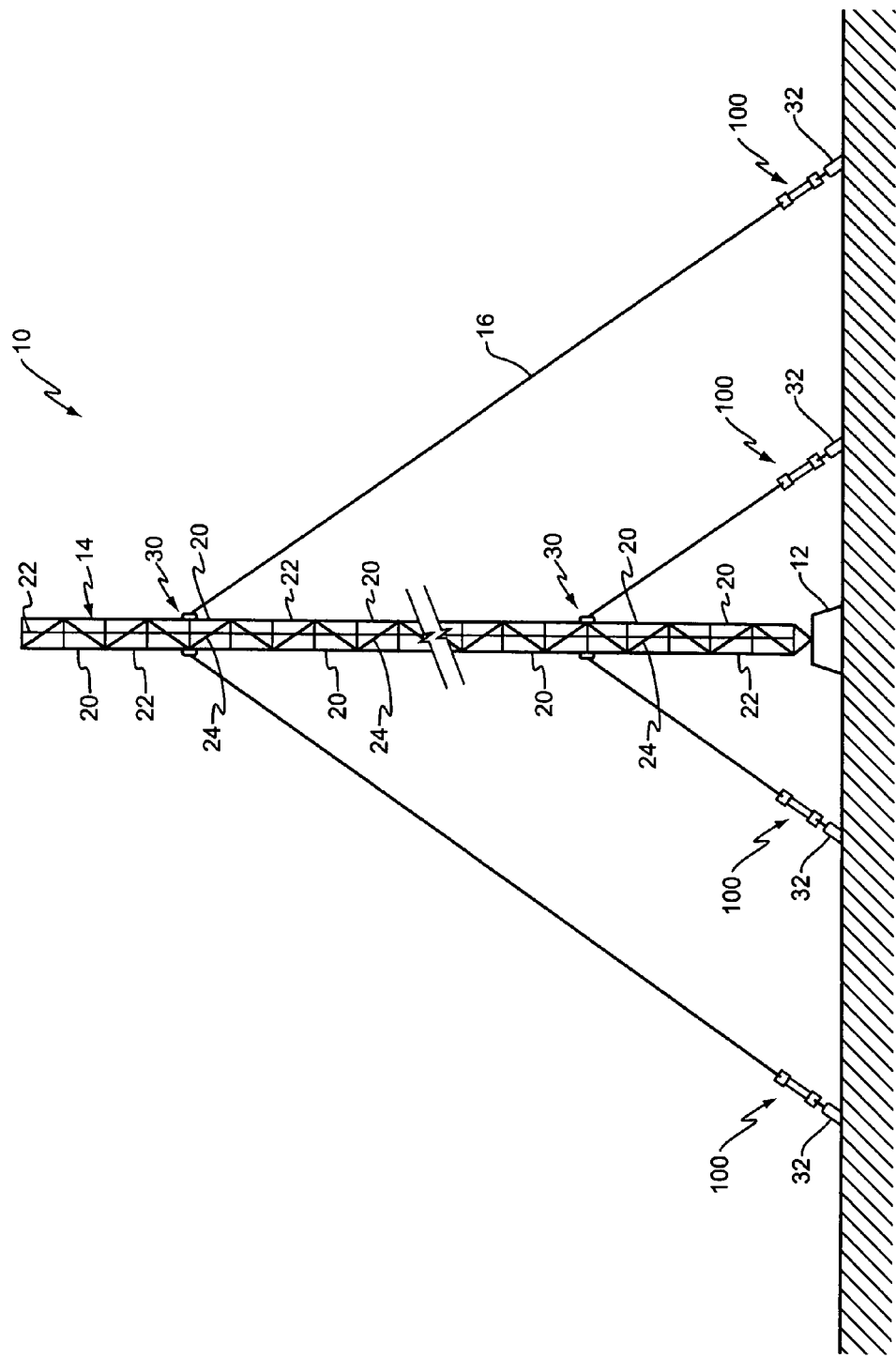
FIG. 1 is a schematic illustration of a typical guyed tower.

FIG. 1 illustrates an exemplary guyed tower 10 according to one embodiment of the present invention. The guyed tower 10 comprises a concrete support base 12, a tower 14 extending vertically from the concrete support base 12, and guy wires 16 that anchor the tower 14 to the ground. The support base 12 and tower 14 may be of any conventional construction. In one embodiment, the tower 14 is constructed in tower sections 20 of predetermined length (e.g., twenty feet) that can be stacked and bolted together on site. Each section 20 may comprise three or four legs 22 interconnected by cross braces 24. The support legs 22 include connecting flanges (not shown) on the top and bottom ends thereof with openings therein to accept bolts for securing the tower sections 20 together. The support legs 22 may be formed of steel angle or steel tube or solid rods. The cross braces 24 may be formed of solid steel rods. The cross braces 24 may be welded or bolted to the support legs 22.

One or more sections 20 of the tower 14 include guy pull offs 30 that typically are welded or integrally formed with the support legs 22 at a predetermined height above the ground. The guy wires 16 extend from the guy pull off 30 to a ground anchor 32. The ground anchor 32 may, for example, comprise a screw-type anchor. An extended length strand take up device 100 is disposed along the length of the guy wire 16 to apply the appropriate tension to the guy wire 16. In conventional tower systems, a double-eye turnbuckle is used to tension the guy wire 16. However, a conventional turnbuckle has limited variability in length. In accordance with the present invention, an extended length strand take up device 100 shown in FIGS. 2 through 6 is used in place of a conventional turnbuckle.

The extended length strand take up device 100 comprises a pair of parallel tension rods 102 and a pair of connecting bodies 120. Each connecting body 120 includes a pair of side load tubes 122 connected by a central web 124. The side load tubes 122 and central web are made of a heavy-gauge steel and are welded together to form a unitary structure. The side load tubes 122 are sized to slide over the respective tension rods 102. The tension rods 102 extend continuously between the connecting bodies 120 without any break. The tension rods 102 are preferably threaded at each end, but may be threaded along their entire length. Nuts 110 thread onto the threaded ends 104 of the tension rods 102 to retain the connecting bodies 120 on the tension rods 102. A bearing plate 106 and washer 108 are disposed between the end of the side load tubes 122 and nuts 110. The nuts 110 serve as stop members to retain the connecting bodies 120 on the tension rods. Other types of stop members may also be used. For example, one end of each tension rod 102 may be enlarged to form an integral stop member. Also, one end of each tension rod 102 could be flared to serve as a stop member.

The central web 124 of the connecting bodies 120 includes a center opening 126 to facilitate connection with a connection member, such as a spelter socket or screw anchor. The central web 124 may also include an inwardly-extending pull tab 128 with a tab opening 130 formed therein. As will be described below, a hydraulic tensioner may be interconnected between the pull tabs 128 to tension the guy wire 16 during installation.

Figure 2:
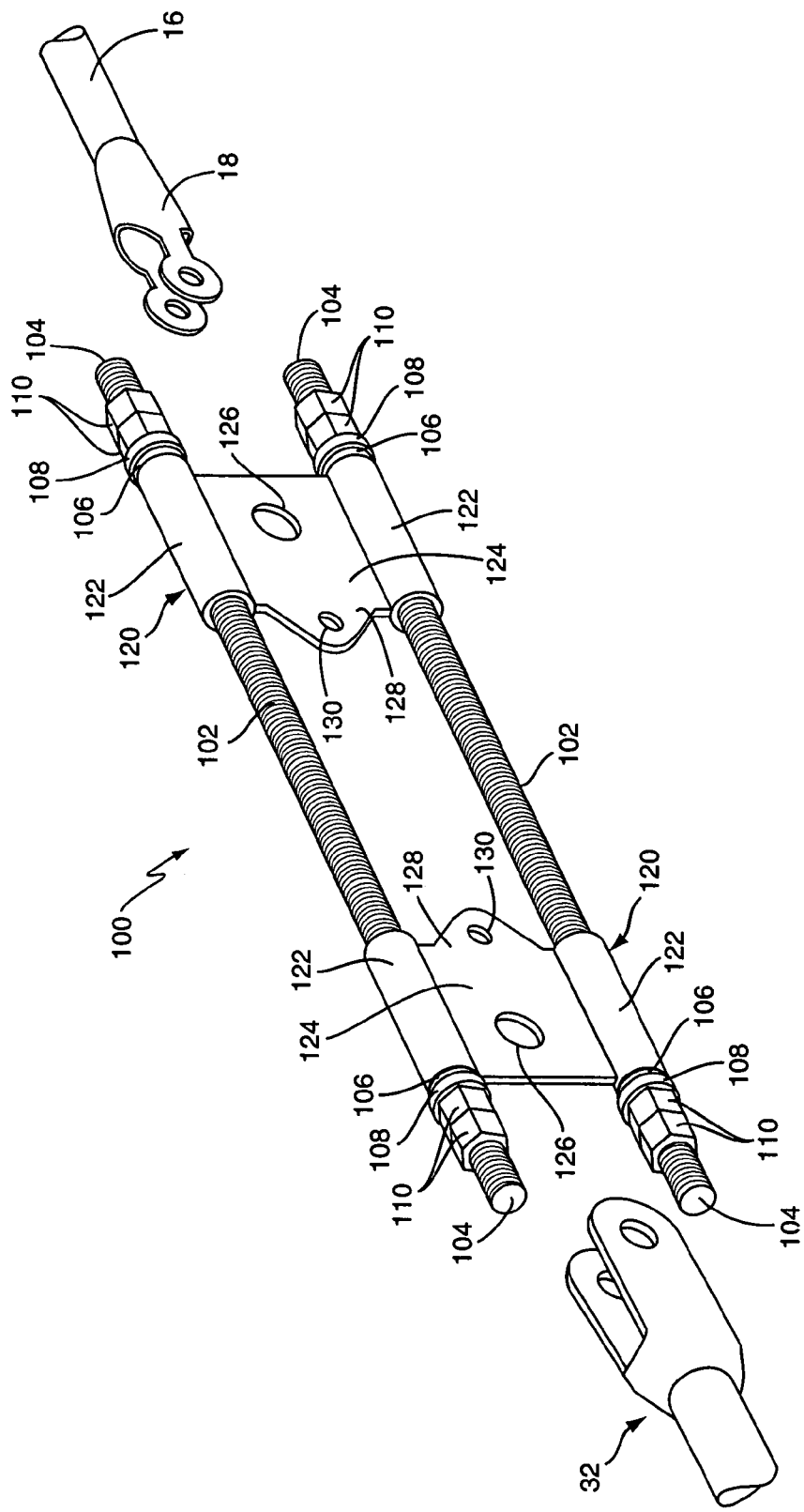
FIG. 2 is a perspective view of a first embodiment of an extended length strand take up device for use with the guyed tower shown in FIG. 1.
Figure 3:
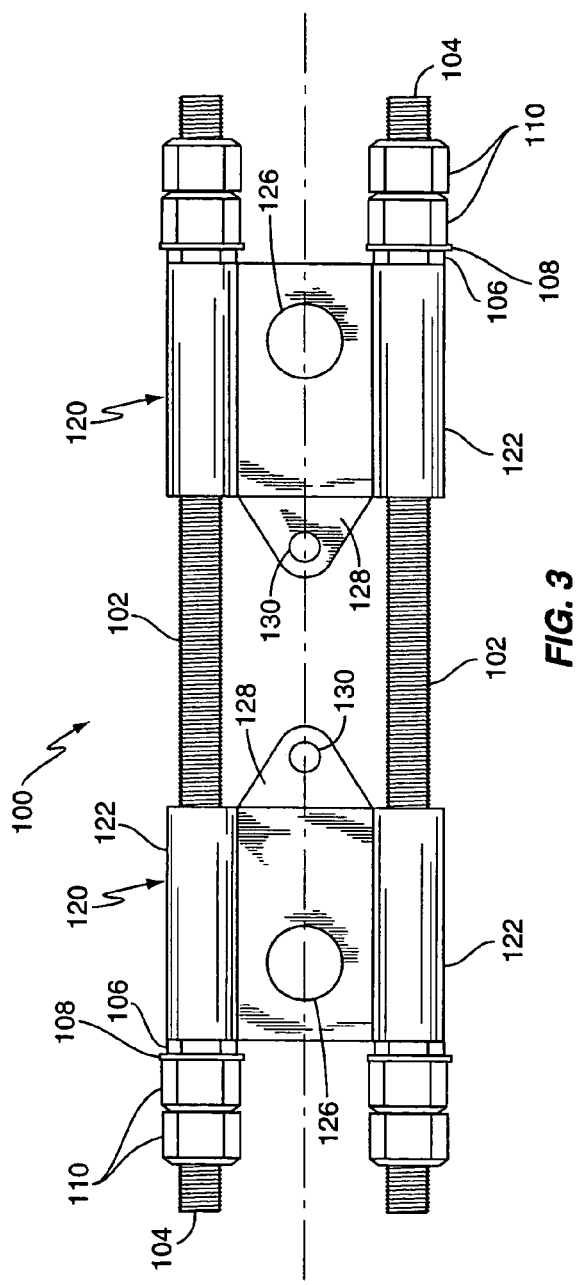
FIG. 3 is a top view of the first embodiment of the extended length strand take up device.
Figure 4:
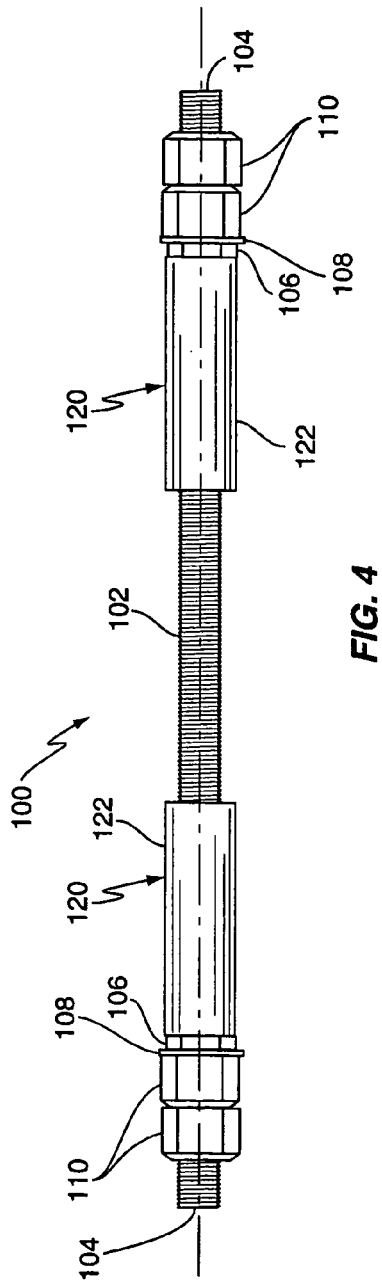
FIG. 4 is a side view of the first embodiment of the extended length strand take up device.

The extended length strand take up device may be installed in the field by a repairman as follows. A first connecting body 120 is secured to the free end of the guy wire 16 by a spelter socket 18 (FIG. 2) or other connection member. The second connecting body 120 is secured to the ground anchor 32. Tension rods 102 of a desired length are inserted through the side load tubes 122 as shown in FIGS. 2 through 4. Each tension rod 102 passes through one side load tube 122 of each connecting body 120 to form an unbroken connection between the connecting bodies. The connecting bodies 120 are pulled toward one another to tension the guy wire 16 to approximately 10% of the breaking strength of the guy wire 16. To pull the connecting bodies 120 together, a hydraulic tensioner (not shown) may be connected to the pull tabs 128 on the connecting bodies 120. After the guy wire 18 is tensioned to the desired amount, the bearing plate 106, washer 108, and nuts 110 are installed on the threaded ends 104 of the tension rods 102 to retain the connecting bodies on the tension rods 102. The nuts 110 should be tightened while the hydraulic tensioner is still in place. After tightening the nuts 110, the hydraulic tensioner can be removed. When the hydraulic tensioner is removed, the tension rods 102 are placed in tension and serve to transfer loads between the connecting bodies 120.

Figure 5:
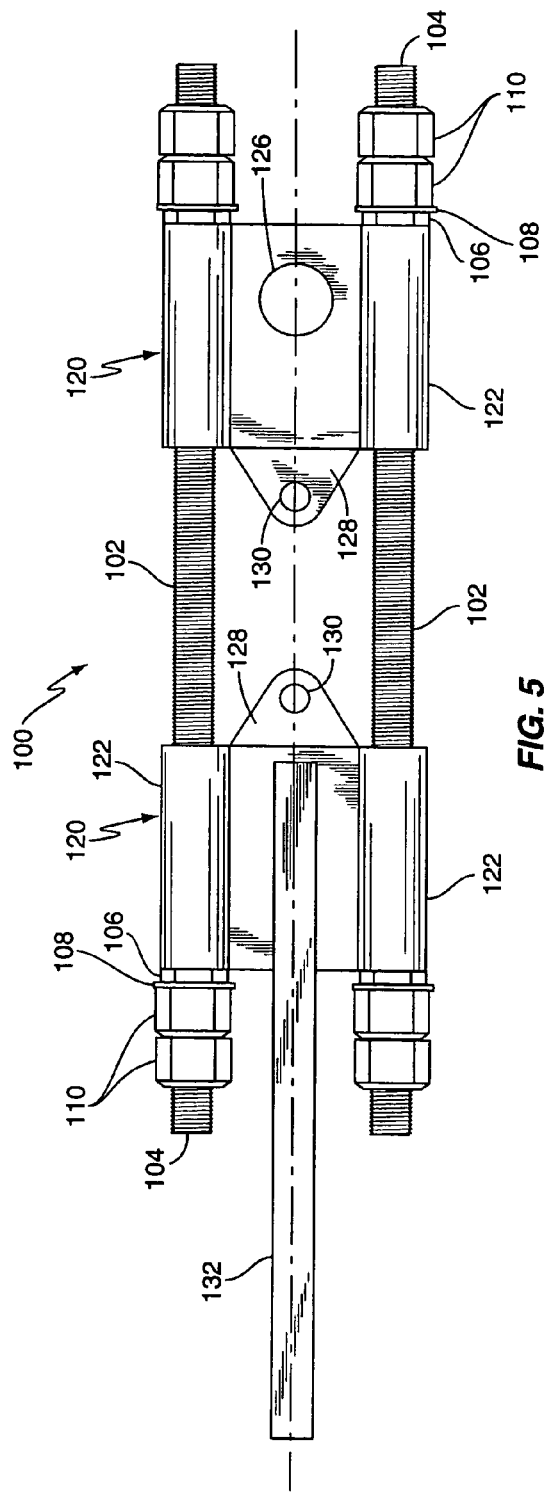
FIG. 5 is a top view of the second embodiment of the extended length strand take up device.
Figure 6:
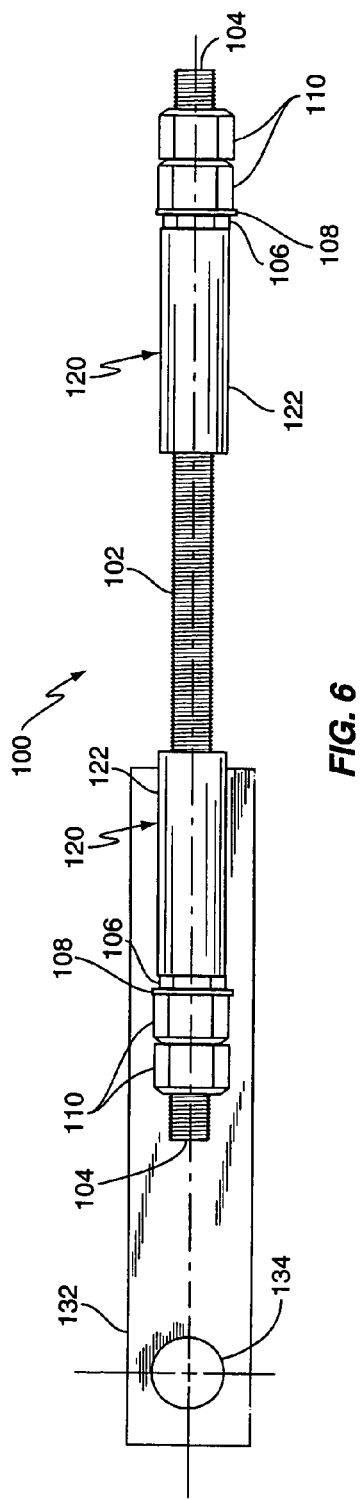
FIG. 6 is a side view of the second embodiment of the extended length strand take up device.

FIGS. 5 and 6 illustrate an alternate embodiment of the extended length strand take up device 100. The embodiment of FIGS. 5 and 6 is the same as the first embodiment with one exception. In the embodiment of FIGS. 5 and 6, the connecting body 120 for connecting with the ground anchor 32 includes a link member 132 that extends outwardly from the central web 124 of the connecting body 120. The link member 132 is made of a flat steel bar that is welded to or integrally formed with the central web 124 of the connecting body 120. In this embodiment, the center opening 126 of the connecting body 120 is replaced by an transverse opening 134 in the link member 132, so that the transverse opening 134 in one connecting body 120 and the center opening 126 in the other connecting body 120 are disposed at ninety degrees with respect to one another. This arrangement of the openings 126 and 134 is useful for certain types of ground anchors.

An advantage of the present invention is that tension rods 102 of any desired length can be used without compromising the structural integrity of the tensioner. If a guy wire 16 is cut short to remove a damaged portion thereof, longer tension rods 102 may be used to make the connection between the guy wire end and the ground anchor 32. Thus, the extended length strand take up device of the present invention avoids the need to replace a guy wire 16 that has been cut short.

What is claimed is:

1. An extended length strand take up device, comprising:
   a. at least two tension rods disposed in parallel spaced relationship to one another;
   b. a first connecting body slidably mounted on the tension rods for connecting the extended length strand take up device to a guy wire, said first connecting body including at least two side load tubes interconnected by a central web, each side load tube being disposed on a respective one of said tension rods; and
   c. a second connecting body slidably mounted on the tension rods for connecting the extended length strand take up device to a ground anchor, said second connecting body including at least two side load tubes interconnected by a central web, each side load tube being disposed on a respective one of said tension rods; and
   d. a stop member at each end of said tension rods to retain the first and second connecting bodies on the tension rods;
   e. wherein said first and second tension rods transfer loads between said first and second connection members when said extended strand take-up device is placed in tension.

2. The extended length strand take up device of claim 1 wherein the first and second connecting bodies further include an opening to receive a connection member.

3. The extended length strand take up device of claim 2 wherein the opening in the first connecting body is formed in the central web of the first connecting body.

4. The extended length strand take up device of claim 3 wherein the second connecting body further comprises a link member extending outwardly from said central web.

5. The extended length strand take up device of claim 4 wherein the opening in the second connecting body is formed in the link member of the second connecting body.

6. The extended length strand take up device of claim 2 wherein the opening in the first and second connecting bodies is formed in the central webs of the first and second connecting bodies.

7. The extended length strand take up device of claim 1 wherein the first and second connecting bodies further include an inwardly projecting pull tab for engagement with a hydraulic tensioner.

8. The extended length strand take up device of claim 1 wherein the tension rods have threaded ends and wherein the stop members comprise nuts that thread unto the threaded ends of the threaded rods.

9. The extended length strand take up device of claim 1 wherein each tension rod extends through the side load tubes in said first and second connecting bodies so that the tension rods transfer loads between the connecting bodies.

10. The extended length strand take up device of claim 1 wherein each threaded rods extends through the side load tubes in said first and second connecting bodies so that the tension rods transfer loads between the connecting bodies.

11. An extended length strand take up device comprising:
    a. a first connecting body for connecting the extended length strand take up device to a guy wire;
    b. a second connecting body for connecting the extended length strand take up device to a ground anchor;
    c. a pair of tension rods extending between and interconnecting said connecting bodies to transfer loads between the connecting bodies when said extended length strand take up device is placed in tension, at least one of said connecting bodies being slidably mounted on said tension rods for movement along said tension rods towards and away from the other connecting body; and
    d. a stop member at each end of said tension rods to retain the first and second connecting bodies on the tension rods.

12. The extended length strand take up device of claim 11 wherein the first and second connecting bodies further include an opening to receive a connection member.

13. The extended length strand take up device of claim 11 wherein the first and second connecting bodies further include an inwardly projecting pull tab for engagement with a hydraulic tensioner.

14. The extended length strand take up device of claim 13 wherein the tension rods have threaded ends and wherein the stop members comprise nuts that thread unto the threaded ends of the threaded rods.

* * * * *

UNITED STATES PATENT AND TRADEMARK OFFICE
CERTIFICATE OF CORRECTION

PATENT NO. : 7,097,154 B2 Page 1 of 1
APPLICATION NO. : 10/924492
DATED : August 29, 2006
INVENTOR(S) : James A. Stevens It is certified that error appears in the above-identified patent and that said Letters Patent is hereby corrected as shown below:

Col. 4, line 58, change "claim 11" to -- claim 12. --.

Signed and Sealed this

Fifth Day of December, 2006

JON W. DUDAS
*Director of the United States Patent and Trademark Office*